Feb. 4, 1941.  H. SCHWARTZ  2,230,700
COOKING DEVICE
Filed March 1, 1939
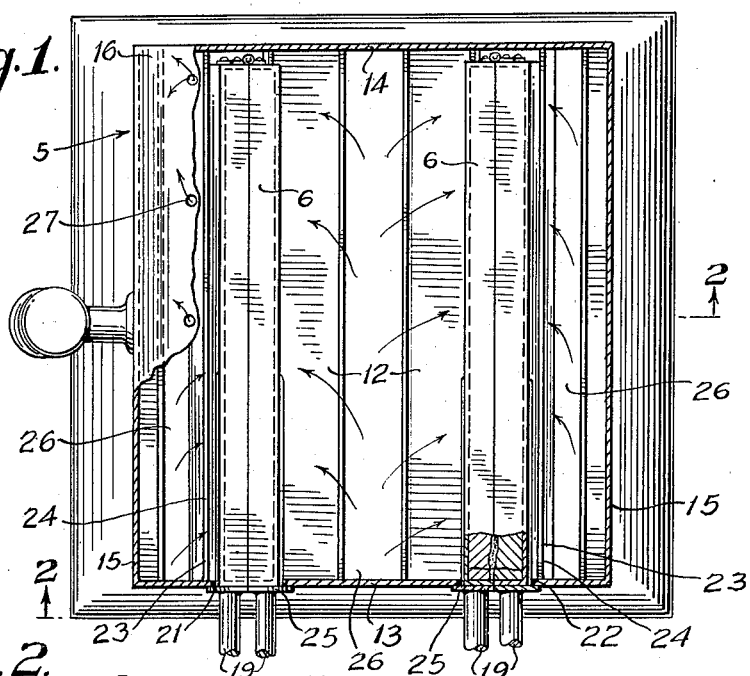
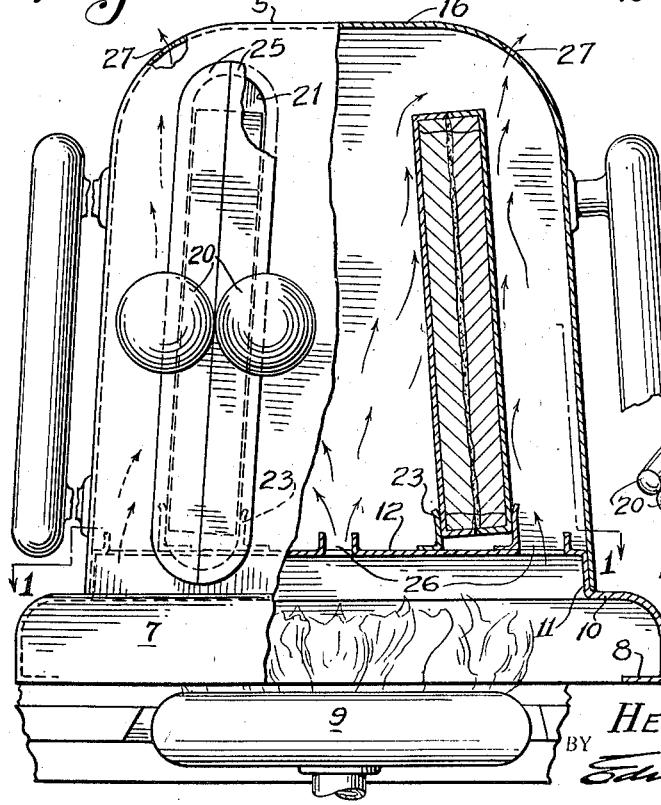
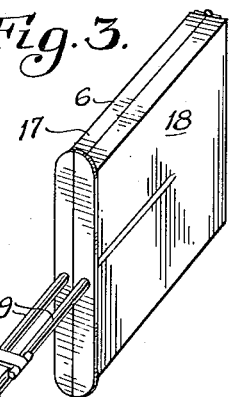
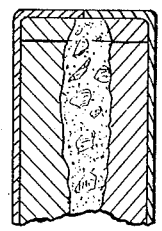
INVENTOR.
HERMAN SCHWARTZ
BY
ATTORNEY.

Patented Feb. 4, 1941

2,230,700

UNITED STATES PATENT OFFICE 2,230,700

COOKING DEVICE

Herman Schwartz, Los Angeles, Calif.

Application March 1, 1939, Serial No. 259,218

2 Claims. (Cl. 53—5)

The present invention relates to cooking apparatus, and is more particularly concerned with that type of apparatus which is employed in toasting or cooking bread, sandwiches, meat, and the like.

It is an object of the present invention to provide an improved cooking apparatus of simple and sturdy construction, capable of being manufactured inexpensively.

Another object of the invention is to provide an improved cooking or toasting apparatus which insures a uniform heating of food products being prepared therein.

A further object of the invention includes the provision of a cooking or toasting apparatus in which a circulating heating medium is prevented from coming into direct contact with food products being prepared, thereby maintaining the palatability of the products at a maximum.

Other objects and advantages of the invention will become apparent from a consideration of the following description and accompanying drawing, in which:

Figure 1 is a sectional view of a cooking apparatus taken generally along the line 1—1 of Figure 2;

Figure 2 is a partially sectional and partially elevational view as seen along the line 2—2 of Figure 1;

Figure 3 is a perspective view of one of the food holders forming part of the cooking apparatus; and Figure 4 is an enlarged sectional view of part of a food product within one of the food holders.

The cooking apparatus includes an enclosure 5 through which a suitable heating medium is to be circulated, and one or more holders 6 for food articles to be treated or prepared within the enclosure. The enclosure consists of a base portion 7 having an internal gas flange 8 for supporting the apparatus firmly upon an associated source of heat such as burner 9. An intermediate portion 10 of the base extends inwardly to form a shoulder 11 for seating the lower part of the enclosure walls, and an upper plate 12, preferably formed internally as a part of the base, extends across the entire enclosure. In effect, this plate forms the bottom of an enclosed heating space, which is completed by the front, back and side walls, 13, 14 and 15 respectively and also by a top portion 16. These last mentioned closure parts are preferably formed integrally, being made from a single sheet of metal or pyrex glass.

Food articles or products, whether they be bread, sandwiches or meats, are confined within the holders, each of which consists of a pair of opposed pans 17 and 18 pivotally secured together by means of a hinge connection. Extending from each pan, is a rod 19, to the outer end of which is secured a handle 20, permitting the pan sections to be opened or closed whenever replacement, removal or the confining of food products therewithin is optionally desired.

The holders are insertable within the enclosure through entrance openings 21, 22, provided in the front wall. Upon passing through an opening, the bottom of each holder travels along a guide rail 23 defined by the angles 24 fixed to the bottom plate and extending from the front wall to the back wall. The holder is supported by these angles and also by the bottom plate, being further maintained in proper position within the enclosure by the engagement of its outer pan surfaces with the sides of the entrance opening. Provision is made for limiting the degree of insertion of the holder within the heating enclosure by forming an extended flange 25 around the forward end of each pan. These flanges abut the front wall of the enclosure and act as stops limiting the inward travel of each holder. In addition, the flanges serve to prevent escape of a heating medium from the enclosure through the entrance openings by completely closing these apertures.

When in use, the food products to be prepared or treated, such as sandwiches, are placed within their respective holders, which are then inserted into the enclosure through the entrance openings and along the guide rails 23. Handles fixed to the side walls of the enclosure permit its placement over a suitable heat source, as the gas burner disclosed in Figure 2. Air heated by the gas flame and the products of combustion pass upwardly into the enclosure through longitudinally extending apertures 26 formed in the bottom plate. This heating medium flows around each holder and transmits the greater portion of its heat content to the food article therewithin. Circulation of the heating medium through the apparatus is assured by providing a plurality of holes 27 at the top of the enclosure.

It is to be noted that the entrance openings are inclined toward one another in an upward direction. This expedient is employed to insure a uniform heating or toasting effect upon the food articles, since it provides a restricted intermediate upward passage for the heating medium between the holders. This restriction causes the heating medium to spread out uniformly from the front to the back walls of the enclosure, producing a uniform transmission of heat along the entire pan surface of each holder. Further assurance that the food products will be heated uniformly is obtained by forming the side apertures in the bottom plate of greater width or area than the central aperture. A larger quantity of the heating medium will pass through the side apertures and along the outer pan surfaces of the holders to compensate for the heat loss through the side walls of the enclosure due to radiation, conduction and convection phenomena.

The pans forming each holder preferably have a snug engagement at their marginal edges to prevent the heating medium from contacting with the food products. Noxious gases or other harmful elements are thereby prevented from attacking the food products and affecting their palatability.

In preparing sandwiches, such as "hamburgers" I have found it desirable to have the bread slices of such thickness that their outer surfaces will be brought in to intimate engagement with the inner surfaces of the holder pans such contact insuring an even toasting of the same, and at the same time insuring a thorough cooking of the meat therebetween. It will be understood that when only toast is required the holder pans may be formed of shallower depth in order that the surfaces of the bread slice may be pressed into close contact with the heated inner surface of the metal holder pans, thus insuring an even toasting of the surfaces of the bread slices.

In actual practice I have ascertained that a "hamburger" sandwich may be completely toasted and the meat cooked therebetween in a minimum of time generally not to exceed three and one-half minutes.

While this invention has been described with particular reference to the specific form shown in the drawing, it is to be understood that such showing is for illustrative purposes only, and is not to be construed as imparting limitations upon the invention, which is best defined by the claims appended hereto.

I claim:

1. A cooking apparatus including an enclosure having a bottom, front, rear and inwardly inclined side walls, said front wall provided with a plurality of openings inclined the same as the inclined side walls, guiding means extending from the openings in the front wall toward the rear wall, a food holder adapted to be sealed insertible through said openings and along said guiding means, said bottom having a longitudinal heat delivery opening between said guiding means, and a heat delivery aperture of greater area between each guiding means and each of said inclined side walls.

2. A cooking apparatus including an enclosure having a bottom, inwardly inclined side walls, front and back walls, said front wall having a pair of entrance openings therein, each opening being disposed in a plane of similar pitch as its adjacent side wall, food holder guiding means on said bottom extending from each opening toward the back wall, a food holder insertable through each opening and along said guiding means into said enclosure, said bottom having an aperture intermediate said guiding means extending between said front and back walls and an aperture of larger area between each guiding means and the inclined side walls.

HERMAN SCHWARTZ.